US007766142B2

(12) United States Patent
Kimmig (10) Patent No.: US 7,766,142 B2
(45) Date of Patent: Aug. 3, 2010

(54) TORQUE TRANSMISSION DEVICE (75) Inventor: Karl-Ludwig Kimmig, Ottenhoefen (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/454,478

(22) Filed: May 19, 2009

(65) Prior Publication Data

US 2009/0283380 A1 Nov. 19, 2009

Related U.S. Application Data

(63) Continuation of application No. PCT/DE2007/002100, filed on Nov. 19, 2007.

(30) Foreign Application Priority Data

Nov. 30, 2006 (DE) ........................ 10 2006 056 976

(51) Int. Cl.
*F16D 21/06* (2006.01)
*F16D 13/58* (2006.01)
(52) U.S. Cl. .................................. 192/48.8; 192/110 B
(58) Field of Classification Search ................. 192/48.8
See application file for complete search history.

(56) References Cited

U.S. PATENT DOCUMENTS 3,185,274 A 5/1965 Maurice ....................... 192/48
4,787,492 A * 11/1988 Ball et al. ................... 192/48.8

(Continued)

FOREIGN PATENT DOCUMENTS

DE 10 2005 037 514 3/2006

(Continued)

OTHER PUBLICATIONS

Search Report of PCT/DE2007/002100.

*Primary Examiner*—Richard M. Lorence
(74) *Attorney, Agent, or Firm*—Davidson, Davidson & Kappel, LLC (57) ABSTRACT

A torque transmission device for the application in the drive train of a vehicle, between a driven shaft of a drive unit and a transmission, with at least two transmission input shafts. The torque transmission device includes at least two friction clutches which respectively feature a clutch disc, which can be coupled respectively with one of the transmission input shafts, and an intermediate pressure plate disposed between the friction lining of the twin clutch discs. The friction lining of both clutch discs may be clamped respectively between the intermediate pressure plate and one pressure plate, in which the respective pressure plates are disposed on the side of the friction lining that faces away relative to the intermediate pressure plate, still the two pressure plates with the intermediate pressure plate are at least rotationally coupled and are axially displaceable by actuation elements relative to the latter, in which at least the two friction clutches form a preassembled clutch assembly. The preassembled clutch assembly can be preassembled on the transmission side and is at least non-rotatably connectable with a drive element mounted on the driven shaft of the drive unit during the assembly of the drive unit and transmission, wherein the intermediate pressure plate is supported by a bearing on at least one of the transmission input shafts in at least one axial direction, in which the intermediate pressure plate features a radial displacement possibility relative to the rotation axis of the transmission input shafts.

10 Claims, 7 Drawing Sheets

U.S. PATENT DOCUMENTS

7,063,195 B2 * 6/2006 Berhan .................. 192/48.8
2006/0289263 A1 * 12/2006 Friedmann et al. ......... 192/48.8

FOREIGN PATENT DOCUMENTS

| DE | 10 2006 022 054 | 12/2006 |
|----|-----------------|---------|
| FR | 2 459 906       | 1/1981  |
| FR | 2 886 996       | 12/2006 |

* cited by examiner

TORQUE TRANSMISSION DEVICE

This is a continuation of prior International Application PCT/DE2007/002100, filed Nov. 19, 2007, which claims priority to German Patent Application DE 10 2006 056 976.8, filed Nov. 30, 2006, the entire disclosures of which are hereby incorporated by reference herein.

The invention relates to a torque transmission device for application in a drive train of a vehicle, between a driven shaft of a drive unit and transmission, with at least two transmission input shafts. The torque transmission device has at least two friction clutches that respectively feature a clutch disc that can be coupled with one of the respective transmission input shafts. An intermediate pressure plate is disposed between the friction lining of the two clutch discs, which axially forms or features a friction surface on both sides, in which the friction lining of both clutch discs can be clamped between the respective intermediate pressure plate and a pressure plate, in which the friction lining is disposed on the respective pressure plate on the side facing away from the intermediate pressure plate. The two pressure plates are rotationally coupled with at least the intermediate pressure plate and are axially displaceable relative to the latter by means of actuation elements. At least the two friction clutches form a preassembled clutch assembly, which can be preassembled on the transmission side and which can be connected at least non-rotatably with a drive element held on the driven shaft of the drive unit when assembling the drive unit and transmission.

Such torque transmission devices, for instance, are proposed by DE 10 2005 037 514 A1.

SUMMARY OF THE INVENTION

The object of the present invention was to improve torque transmission devices of the type mentioned above, both in design and function; in particular, a perfect holder or if applicable a positioning means should be provided both in the radial and axial directions of the clutch assembly. The design of the torque transmission device, in particular, should enable at least partial compensation of the axial offset present in many cases or, if applicable, of the possibly present alignment error between the rotation axis of the driven shaft of the drive unit and the transmission input shafts.

The tasks based on the object of the present invention, amongst others, are solved in that the intermediate pressure plate on at least one of the transmission input shafts in at least one axial direction is supported by means of a bearing, wherein the intermediate pressure plate still features least a slight radial displacement possibility relative to the rotation axis of the transmission input shaft. By means of such a radial displacement or, if applicable, alignment possibility for the intermediate pressure plate relative to the transmission input shaft that axially supports the latter, excessive radial locking can be avoided between torque transmission device components through which also relief is attained for the corresponding transmission bearing that supports the transmission shaft. For an axial support of the intermediate pressure plate in at least one axial direction, the bearing that can be formed for instance by means of a roller bearing, at least in this respective axial direction, is axially and rigidly supported on the associated transmission input shaft or if applicable is connected with the latter. The roller bearing can consist of a single-row ball bearing that is designed to withstand sustained stress.

It can be particularly advantageous when a radial displacement possibility is provided between the bearing mounted on one of the transmission input shafts and the intermediate pressure plate. The radial displacement possibility can also be interposed between the bearing and the transmission input shaft holding it.

In a particularly simple manner, it can be ensured that the radial displacement possibility is provided by means of radial clearance, wherein this clearance can be provided between at least one component that axially supports the intermediate pressure plate and the intermediate pressure plate itself. The respective clearance, however, can also be provided at a different point.

Still it can be functional if the intermediate pressure plate in radial direction is displaceable against displacement resistance between the intermediate pressure plate and the bearing and/or between the bearing and the transmission input shaft holding the bearing. It can be functional if the displacement resistance is sufficiently great in order to hold the intermediate pressure plate in radial direction in a definite position. The displacement resistance for instance can be generated by a frictional connection.

To provide axial support, the intermediate pressure plate can have a radially internal annular section that is axially supported and/or clamped in position.

The bearing can comprise a bearing mounted on one of the transmission input shafts, preferably the hollow shaft that accommodates or if applicable at least supports the intermediate pressure plate axially. The bearing can comprise a roller bearing with an internal bearing race mounted on one of the transmission input shafts and an external bearing race that interacts functionally with the intermediate pressure plate at least in an axial direction. The actuation forces of the friction clutches are supported preferably by the bearing or absorbed if applicable.

BRIEF DESCRIPTION OF THE DRAWINGS

Further advantages, features and details of the invention can be derived from the following description.

The figures show the following:

FIG. 5b is a perspective section view of the combination shown in FIG. 4a;

DETAILED DESCRIPTION

Figure 1:
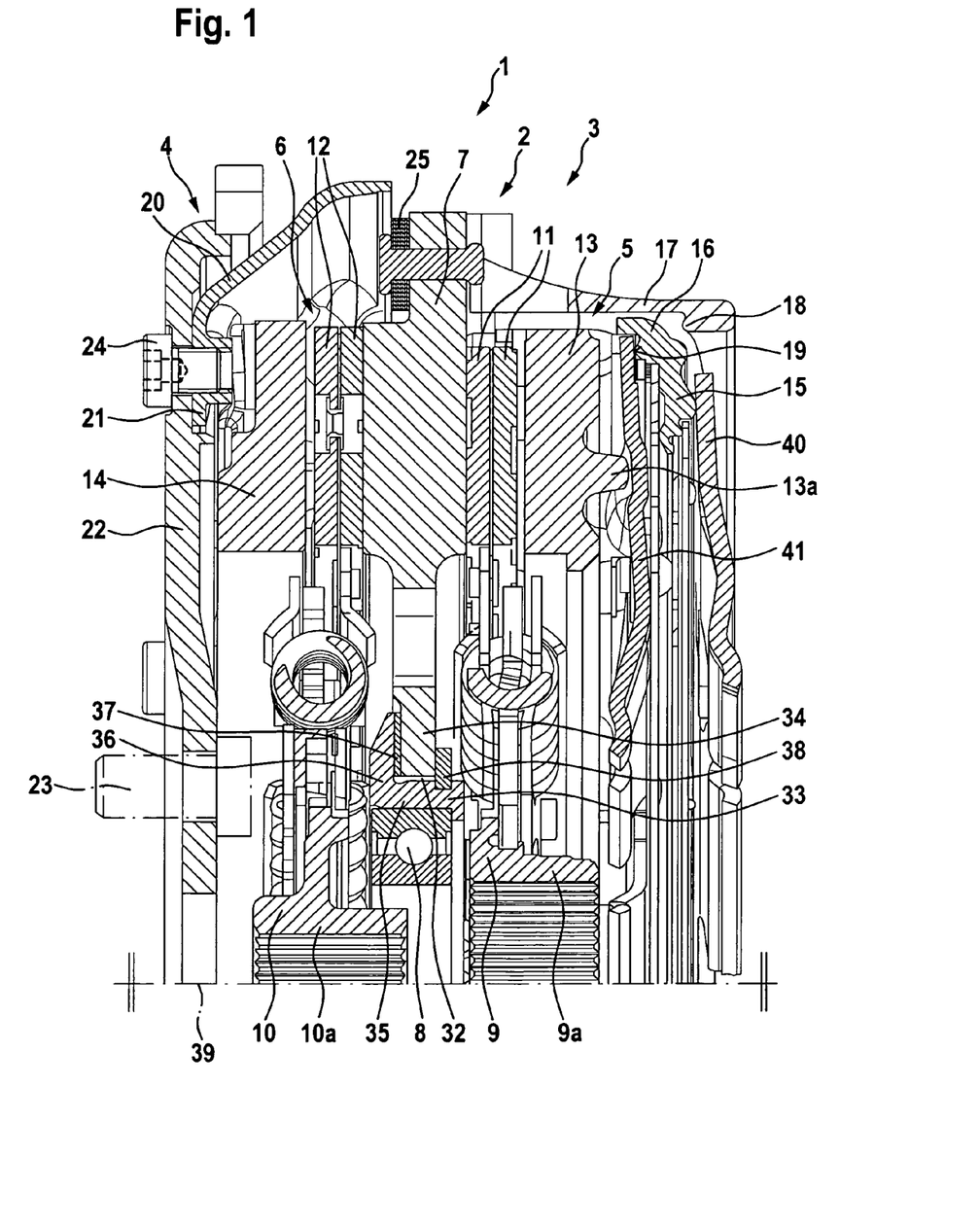
FIG. 1 is a section through a torque transmission device according to the invention.

The torque transmission device 1 depicted in FIG. 1 comprises two subunits 3, 4. The subunit 3 comprises at least two friction clutches 5, 6 and can be mounted on a transmission—not depicted in detail—thus, in a manner similar to the description in DE 10 2005 037 514 A1. In comparison with this known state of the art, the clutch assembly according to FIG. 1 differs, however, as explained in detail in the following passage, through the possibility of radial displacement of the intermediate pressure plate 7, common to the two clutches 5 and 6, relative to the transmission input shaft on which a bearing 8 interacting with the intermediate pressure plate 7 is mounted or if applicable will be mounted. The bearing 8 according to FIG. 1 is similar in design to that according to FIG. 1 of DE 10 2005 037 514 A1. This bearing can also feature a different embodiment, as this is also disclosed for instance in connection with the other figures of DE 10 2005 037 514 A1. The bearing 8 depicted in FIG. 1 is to be mounted on the external transmission input shaft formed as a hollow shaft, which accommodates the second transmission input shaft.

Regarding the embodiment of the clutch assembly 1 according to the invention, reference is still drawn to the features described in DE 10 2006 022 054 A1. Thus, reference is particularly drawn to possible subdivision, described in this document, of the clutch disc provided at least on the engine side. Such a subdivision simplifies the assembly and the axial security of the bearing 8 on the corresponding transmission input shaft.

The torque transmission device 1 comprises two clutch discs 9, 10, which can be coupled non-rotatably with a respective transmission input shaft. For this purpose, the clutch discs 9, 10 are provided with an annular-toothed hub 9a, 10a, which interact with externally toothed transmission input shafts. The hub 9a can be mounted on a so-called hollow transmission input shaft, which accommodates a further coaxially disposed transmission input shaft, which can be connected with the hub 10a.

In the depicted exemplary embodiment, the clutch discs 9 and 10 are equipped with a torsional vibration damper. At least one of the clutch discs 9 and 10, however, could also be formed at least essentially rotationally rigidly, as known in the prior-mentioned documents.

The clutch discs 9 and 10 carry friction lining 11, 12 radially outwardly, axially between which respectively, preferably a so-called cushion deflection is provided, which enable progressive build-up or if applicable reduction of the torque transmittable by the friction clutches 5 and 6.

On the side of the clutch discs 9 and 10 facing away relative to the intermediate pressure plate 7, a pressure plate 13, 14 respectively has to be assigned to the corresponding friction clutch 5, 6.

The pressure plate 13 of the friction clutch 5 is connected non-rotatably with the intermediate pressure plate indirectly or directly, however, is limitedly axially displaceable. For this purpose, for instance, leaf spring elements can be used, which are preferably uniformly distributed over the circumference.

The pressure plate 14 of the friction clutch 6 is also coupled with the intermediate pressure plate 7 in the same or similar manner if applicable.

Housing 15 is connected with the intermediate pressure plate 7, of which only a radially aligned section 16 is visible in FIG. 1. This housing 15 has axially extending sections that overlap the pressure plate 13 radially outside and is permanently connected with radially extending sections of the intermediate pressure plate 7 outside the friction lining 11. Through this connection the housing 15 is also supported axially by means of the bearing 8 in at least one axial direction.

The pressure plate 14 carries an annular tension element 17 that forms support sections 18 for a lever element 40 on the side of the radial section 16 facing away from the pressure plate 13. The lever element 40 can be formed by means of a component like a diaphragm spring, which features a plurality of levers provided in an annular arrangement. The lever element 40, however, can also be formed by a plurality of individual levers, wherein they are preferably coupled-together by means of a connection element.

Regarding the embodiment of such a component, reference is likewise drawn to the prior-mentioned state of the art, in particular to DE 10 2005 037 514 A1.

For the actuation of the friction clutch 5, a lever element 41 is provided axially between the pressure plate 13 and the radial section 16 of the clutch housing 15, which either resembles a membrane or which can be formed like a diaphragm if applicable. The corresponding lever element 41 rests with radially external sections on a rolling facing 19 of the housing 15 and with radially further internally placed sections pressurizes axial cams or if applicable support sections 13a of the pressure plate 13. In this regard, reference is drawn likewise to the prior-mentioned state of the art.

The intermediate pressure plate 7 is connected in this case with an annular connection component 20, which is a pot-shaped component in this case. The connection component 20 has a radial section 21 disposed on the engine side, which can be connected with a drive plate 22 in this case formed as a flywheel. The drive plate 22 can be connected radially internally by means of screws 23 with the driven shaft of a driving machine, such as an internal combustion engine in particular. In the radially external section of the drive plate 22, screw connections 24 are provided, by means of which the connection component 20, as in the case of a torque converter, is fixed on the drive plate 22.

The connection component 20, disc-shaped or if applicable pot-shaped, can also be connected with the drive plate 22, in a different manner. For instance, an axial plug connection could be provided between the two components 20 and 22, which becomes effective when joining the drive unit and the transmission. This plugged connection or, if applicable, the profiles forming said connection, for example, tooth systems, can be clamped in the circumferential direction to prevent noise. In addition, an axially effective, automatic locking device can be provided.

The fixed connection to be established between the connection component 20 and the drive plate 22, which is provided here by means of the screw connection 24 is preferably formed in a manner such that exact centering between the two components 20 and 22 occurs so that the clutch assembly comprising the two clutches 5 and 6 can at least be partially radially centered by means of the connection component 20.

Figure 2:
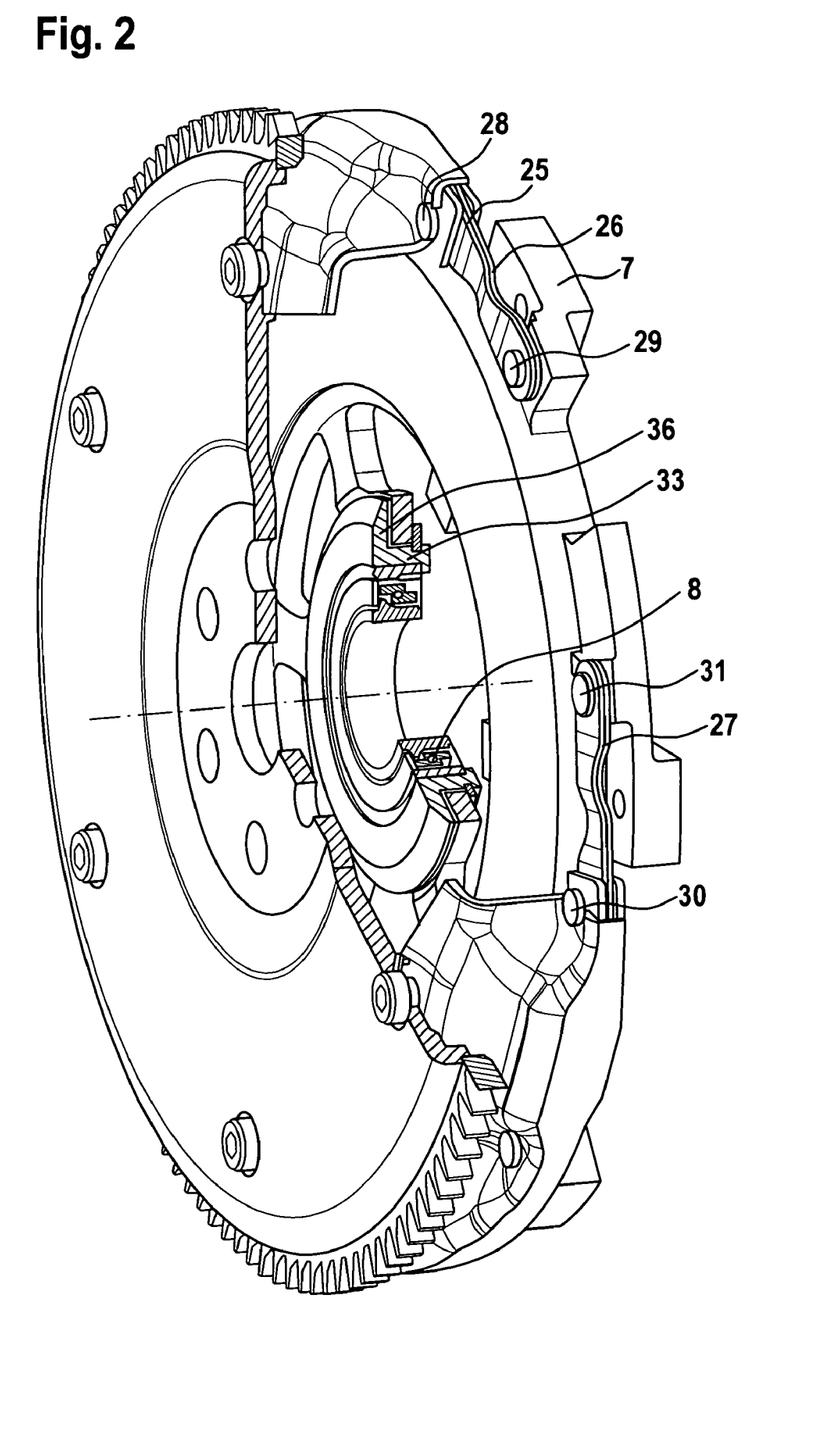
FIG. 2 is a perspective illustration of individual components of the torque transmission device depicted in FIG. 1.
Figure 3:
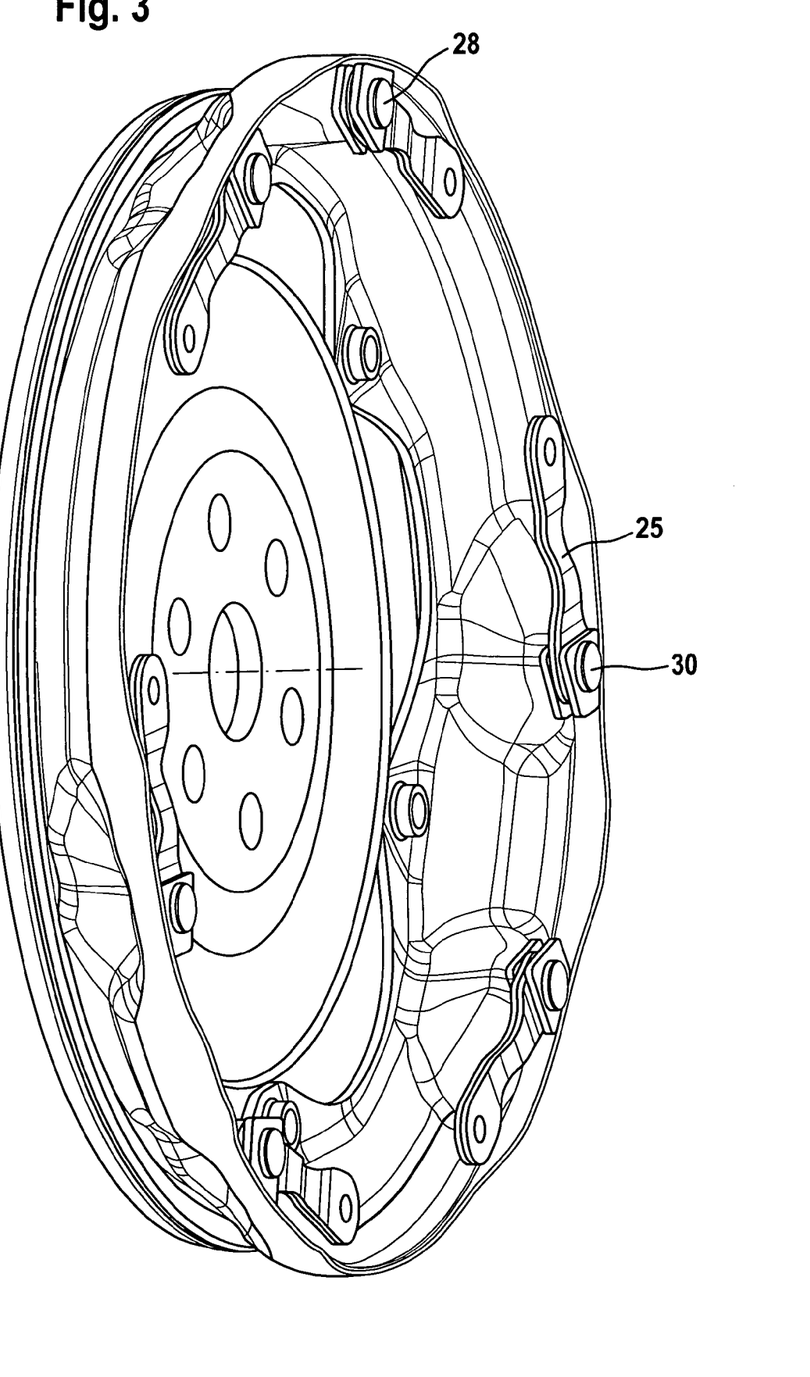
FIG. 3 is a further perspective illustration of components of the torque transmission device depicted in FIG. 1.

As can be derived in particular from FIGS. 2 and 3, the connection between the connection component 20 and the clutch assembly featuring the intermediate pressure plate 7 is established by means of leaf spring connections 25, which are disposed over the circumference in a distributed manner. In the depicted exemplary embodiment, two groups of leaf spring connections 26, 27 are provided, which act in opposite orientation in the circumferential direction. This means, for example, that in tensile stress of the leaf springs 26 the leaf springs 27 are subjected to Kinking stress and vice versa. In the depicted exemplary embodiment, the leaf spring connections 25 are respectively formed of several individual leaf springs, which are axially laid over one another. The number of individual leaf springs laid over one another can thereby lie in the order of magnitude between two and ten, preferably between four and eight.

The leaf springs 26, 27 forming the leaf spring connections 25 in the depicted exemplary embodiment are on the one hand rigidly connected with the connection component 20 and on the other side with the intermediate pressure plate 7. Preferably, these connections are made, as depicted, by means of rivet connections 28, 29 or if applicable 30, 31. The leaf spring groups 26 and 27 enable cardanic suspension of the clutch assembly on the connection component 20 featuring the friction clutches 5 and 6. This means that the leaf spring groups 26 and 27 facilitate non-rotatable connection, however, at least allow certain angular alignment between the intermediate pressure plate 7 and the connection component 20.

As may be derived from FIG. 1, in particular, the intermediate pressure plate 7 in a torque transmission device 1 mounted in a vehicle is supported at least in an axial direction or if applicable is fixed by means of the bearing 8 then fixed axially on the transmission input shaft formed as a hollow shaft of a transmission device. This axial fixation is preferably chosen in a manner such that, via the bearing 8, the forces required to actuate the friction clutches 5 and 6 introduced through the prior-mentioned lever elements, in the depicted exemplary embodiment, are supported axially in the clutch assembly. In the depicted exemplary embodiment according to FIG. 1, the intermediate pressure plate 7 must therefore be supported at least in the axial direction on the drive plate 22. It can be advantageous, however, also if the bearing 8 is formed in a manner such that axial fixation of the intermediate pressure plate 7 occurs in both axial directions. This in particular is then advantageous if both friction clutches 5 and 6 feature different actuation directions, axially.

The intermediate pressure plate 7 is limitedly displaceable in radial direction relative to the transmission input shaft holding the bearing 8, so that at least an alignment error between the driven shaft of the drive unit driving the drive plate 22 and the transmission input shaft accommodating the bearing 8 or if applicable the hubs 9a, 10a is enabled.

In the depicted exemplary embodiment, this limited radial displacement possibility is ensured in that preferably annular clearance 32 acting between the transmission input shaft holding the bearing and the intermediate pressure plate 7. In the depicted exemplary embodiment this clearance 32 is functionally provided between the bearing 8 or if applicable an intermediate element 33 carried by the latter and the radially internal sections 34 of the intermediate pressure plate 7. The intermediate element 33 has an axial section 35, as well as an adjoining radial section 36, on which the radially internal sections 34 of the intermediate pressure plate 7 are supported axially. In the depicted exemplary embodiment, the axial support takes place by means of interposed frictional or, if applicable, slip lining 37. To ensure axial security, a locking element 38 is provided on the side of the radial internal section 34 facing away from the radial section 26.

Although axial locking can occur between the intermediate pressure plate 7 and the transmission shaft accommodating the bearing 8 or if applicable between the intermediate element 33, practically in a frictionless manner, it is particularly functional for many application cases when the radial internal sections 34 of the intermediate pressure plate 7 are at least slightly stressed axially, so that the intermediate pressure plate 7 can be displaced against radial displacement resistance relative to the transmission input shaft or if applicable against the bearing 8. In order to generate such displacement resistance, the locking element 38, for instance, can be formed by means of a diaphragm spring type of component that pressurizes the radial internal sections 34 in the direction of radial sections 36 of the intermediate element 33. In the depicted exemplary embodiment, a direct support would be provided between the locking element 38 and the sections 34. For many application purposes, however, it is advantageous if between the axially acting locking element 38, possibly formed as diaphragm-spring, and the radial sections 34 at least a friction lining or slip lining if applicable is interposed. If necessary between such a friction lining or if applicable slip lining and the locking element 38, an annular support disc or if applicable contact disc, preferably made of steel, can be provided.

In a modification of the exemplary embodiment depicted in FIG. 1 a corresponding radial clearance, 32 can also be provided between the bearing 8 and the transmission input shaft accommodating the latter. When using a roller bearing a corresponding axial support or if applicable radial displacement possibility if applicable against a resistance must then be facilitated between the transmission input shaft and the internal ring of bearing, and thus in a manner as is facilitated between the radial internal sections 34 of the intermediate pressure plate 7 and the intermediate element 33.

For some application cases it can be also advantageous, if between the bearing 8 and the intermediate pressure plate 7 or if applicable between the bearing 8 and the transmission input shaft accommodating the latter or if applicable axially supporting the latter, at least a slight oscillation possibility is present, for instance, which is ensured by a bearing formed like a spherical zone or, if applicable, support, whose midpoint or, if applicable, fulcrum preferably lies at least approximately on the rotation axis 39 of the torque transmission device 1 or, if applicable, of the driven shaft of the drive unit moving the drive plate 22. Thus, possibly existing alignment errors between the rotation axis of the driven shaft and the rotation axis of the transmission input shafts can be balanced and hence undesired stresses within the entire system can be avoided.

The torque transmission between engine and transmission is ensured via the essentially torsionally stiff connection, comprising a drive plate 22, annular connection component 20, and leaf-spring arrangement 25, wherein via the leaf-spring arrangement 25, the torque transmission occurs from the crankshaft first then to the intermediate pressure plate 7 and then via the latter to the clutches. This arrangement centers the twin clutch 2 that is formed by the subunit 3 relative to the rotation axis of the crankshaft of the internal combustion engine or if applicable of the motor. Possibly existing angular displacements between the rotation axis of the crankshaft and rotation axis of the transmission input shaft can be balanced in particular by means of the leaf-spring arrangement 25.

The axial bearing between the intermediate pressure plate 7 and the corresponding transmission input shaft absorbs the actuation forces of the friction clutches 5 and 6 and other axially acting forces and supports these forces on the corresponding transmission input shaft. At the same time, this axial bearing has at least a small radial displacement possibility relative to the corresponding transmission input shaft or if applicable low radial stiffness and hence facilitates the balancing effect of the radial displacement between the rotation axis of the crankshaft and the rotation axis of the corresponding transmission input shaft.

The axial bearing can be formed in different ways, for example, as an axial roller bearing, as an axial plain bearing or as a combination for example comprising a radial roller bearing and an axial plain bearing or vice versa. The transmission-side axial bearing of the intermediate pressure plate 7 or if applicable of the subunit 3 can be provided with a lock against axial lifting of the bearing. However, also embodiments where such axial locking is not required are possible. The latter can be the case for example with twin clutches 2, with lever elements 40 preloaded axially via the declutching system or if applicable 41, since it is ensured that, for example, the radial internal section 34 of the intermediate pressure plate 7 is always pushed axially in the direction of the radially extending support section 36.

Figure 4A:
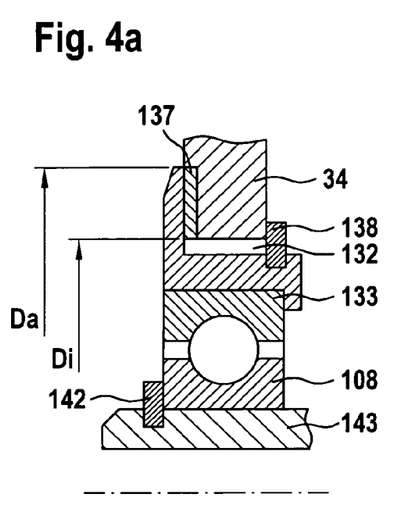
FIG. 4a is a section view of a first embodiment of the combination of a radial bearing with an axial bearing including an intermediate element.
Figure 7A:
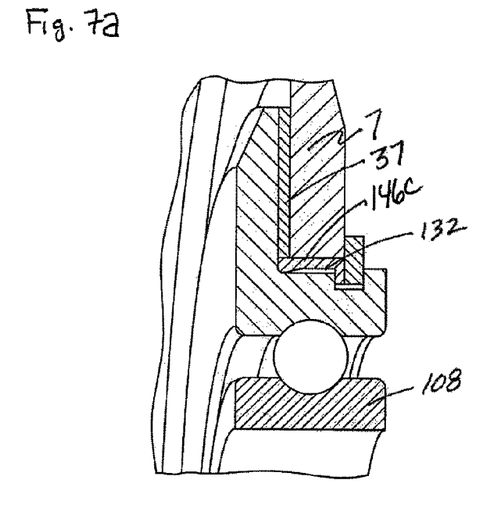
FIG. 7a is a perspective section view of a ninth embodiment of the combination including a radial spring element wherein the radial section of the intermediate element is formed as a single piece with the external bearing race of the roller bearing.

As apparent in FIG. 4 that depicts different exemplary embodiments a) to d), the combination of a radial bearing with an axial bearing can be realized in different ways. In FIG. 4*a*), the radial bearing is provided as a ball bearing 108, which is depicted in a simplified manner. On this bearing 108, an intermediate element 133, formed as a bearing bush, is shrunk on to form an axial plain bearing 137. The radial section of the intermediate element 133, serving as axial support, however, can also be formed as a single piece with the external bearing race of the roller bearing 108 (ref. FIGS. 5*b* and 7*a*). The radial clearance 132 is provided between the outer bearing race of the roller bearing 108 or if applicable between the intermediate element 133 and the radial internal sections 34 of the intermediate pressure plate 7.

In FIGS. 4*a* to 4*d*, two axial supports or if applicable positioning rings 138, 142 are depicted and the end section 143 as well of a transmission input shaft formed here by means of a hollow shaft. Within this hollow shaft, a further transmission input shaft can be provided.

Figure 4B:
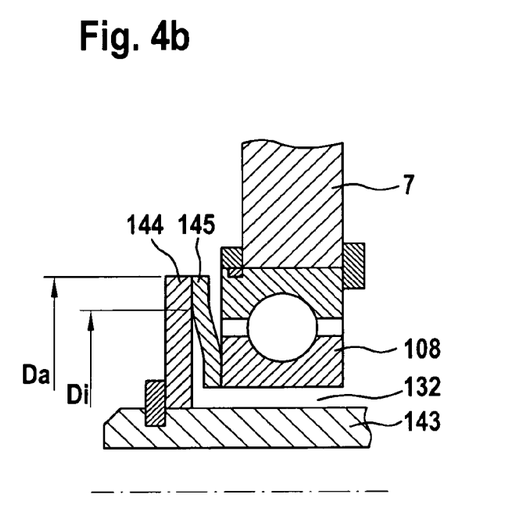
FIG. 4b is a section view of a second embodiment of the combination of a radial bearing with an axial bearing including an axial support plate and a support disc.

In the embodiment according to FIG. 4*b*), the radial clearance 132 between the transmission input shaft 143 and the bearing 108 formed here as a roller bearing is provided. On the outer bearing race of this bearing 108, the intermediate pressure plate 7 is mounted and locked axially. The internal bearing race of the bearing 108 is supported axially via a support plate 144 mounted on the transmission input shaft 143. Between the bearing 108 or if applicable, the radial internal bearing race of the bearing 108 and the axial support formed by the support plate 144, an axially resilient support disc 145 is provided here. The support disc 145 can allow axial resilience or if applicable displacement in the order of magnitude 01 to 0.5 mm of the bearing 108 or if applicable of the intermediate pressure plate 7. If required, on the side of the bearing 108, axially facing away from the support disc 144, likewise, an axial retaining ring is provided, through which also axial clamping of the internal bearing race can be ensured.

Figure 4C:
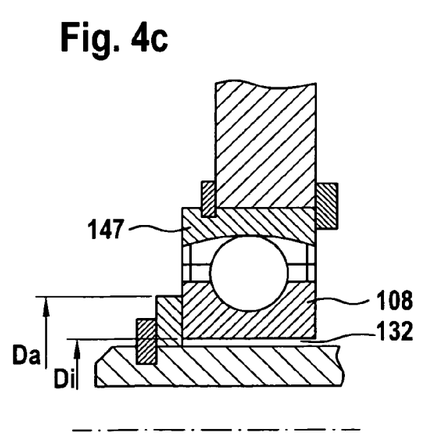
FIG. 4c is a section view of a third embodiment of the combination of a radial bearing with an axial bearing including a self-aligning bearing.

As may be derived from FIG. 4*c*), as a special bearing, the bearing 108 can also particularly comprise a self-aligning bearing 147. The self-aligning bearing 147, as depicted, can be formed as a self-aligning ball bearing or as self-aligning roller bearing.

Figure 4D:
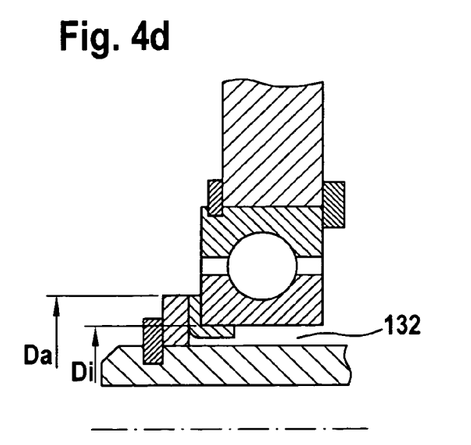
FIG. 4d is a section view of a fourth embodiment of the combination of a radial bearing with an axial bearing including a further bearing version.

In FIG. 4*d*) a further bearing version is depicted.

In an embodiment according to FIG. 4*a*), the effective slide surface between the diameters Da and Di is larger than in the embodiments according to FIGS. 4*b*) to 4*d*).

Figure 5A:
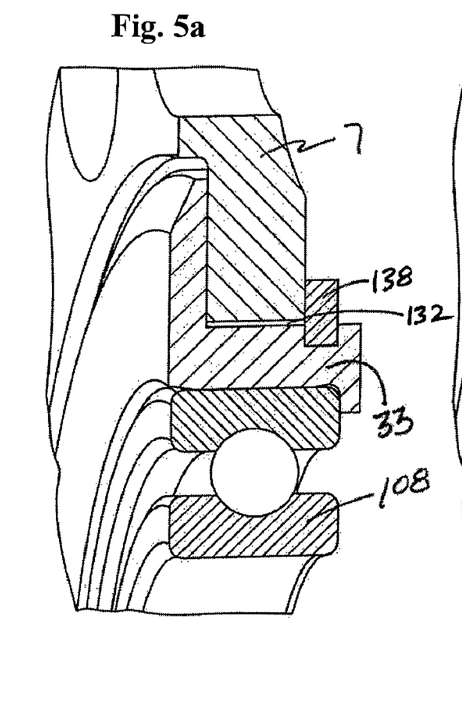
FIG. 5a is a perspective section view of a fifth embodiment of the combination of a radial bearing with an axial bearing wherein the radial section of the intermediate element is formed as a single piece with the external bearing race of the roller bearing.
Figure 5B:
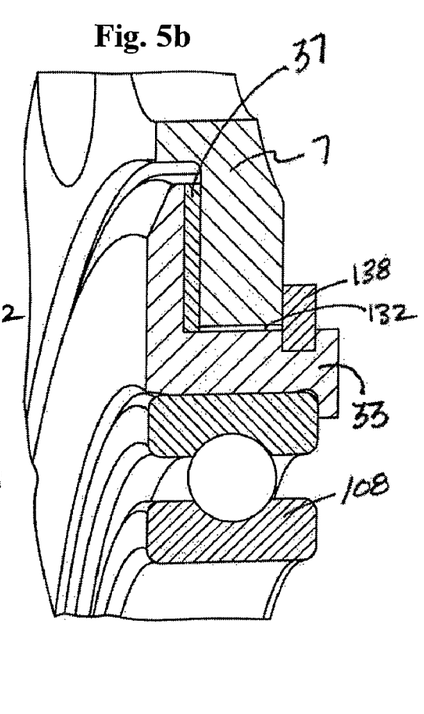
Figure 5C:
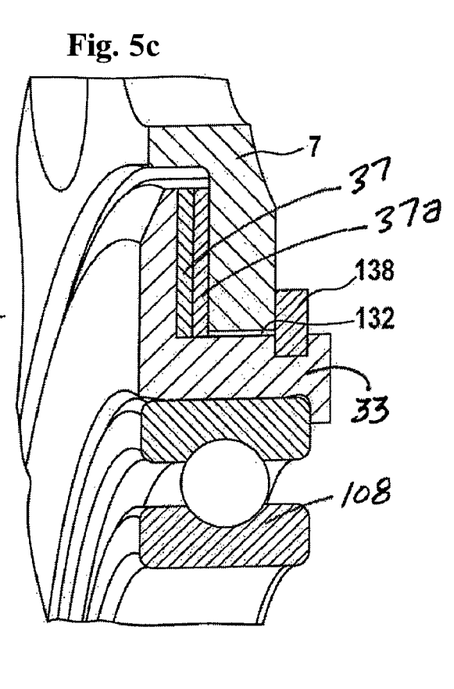
FIG. 5c is a perspective section view of a sixth embodiment of the combination including a friction lining and an annular support disc.

FIG. 5*a* is a perspective section view of an example embodiment of the combination of a radial bearing with an axial bearing wherein radial section 36 of the intermediate element is formed as a single piece with the external bearing race of roller bearing 108. FIG. 5*b* is a perspective section view of the combination shown in FIG. 4*a*. FIG. 5*c* is a perspective section view of an example embodiment of the combination including friction lining 37 and annular support disc 37*a*.

Figure 6A:
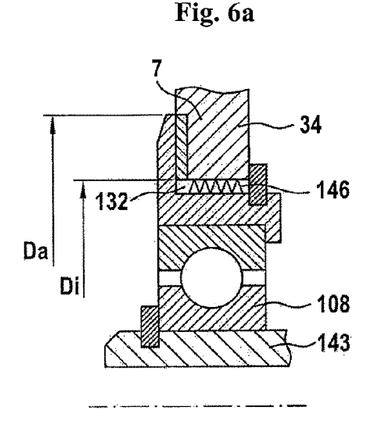
FIG. 6a is a section view of a seventh embodiment of the combination of a radial bearing with an axial bearing including a radial spring element.
Figure 6B:
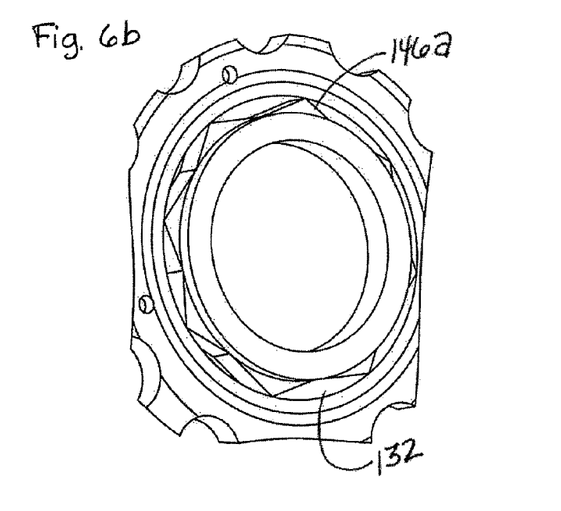
FIG. 6b is a partial perspective view of a eighth embodiment of the combination of a radial bearing with an axial bearing including a radial spring element.

In FIGS. 6*a* and 6*b*, further embodiment variants of a bearing 108 are depicted, wherein a radial elastic element or if applicable a spring 146 is disposed functionally between the transmission input shaft 143 and the radial internal section 34 of the intermediate pressure plate 7.

Figure 6C:
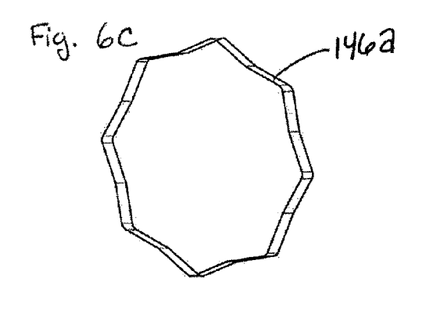
FIG. 6c is a perspective view of a the radial spring element FIG. 6b.
Figure 6D:
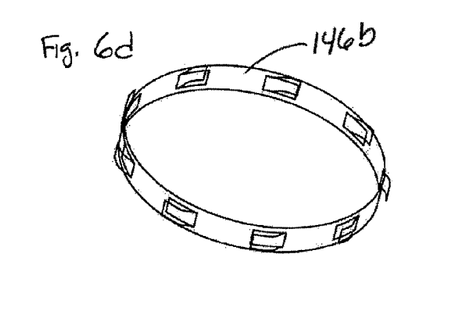
FIG. 6d is a perspective view of an alternative embodiment of the radial spring element of FIG. 6b including radial tongues.

The spring element 146 can be made stiff in different levels depending on the application. The radial spring element can be created by means of different spring elements, which are at least mounted in the gap 132, schematically depicted in the FIGS. 4*a*) to 4*d*) and in FIGS. 6*a* and 6*b*. In FIGS. 6*c* and 6*d* different embodiments of such spring elements 146 are depicted. FIG. 6*c* is a perspective view of the radial spring element 146*a* of FIG. 6*b*. FIG. 6*d* is a perspective view of an alternative embodiment of the radial spring element 146*b* of FIG. 6*b* including radial tongues. The combination of radial, frictional clamping of the internal section 34, of an intermediate pressure plate 7, and of the spring elements, resilient in radial direction, damps possible radial vibrations of the twin-friction-clutch assembly that occur at least in certain states of vehicle operation or if applicable of the internal combustion engine operation.

Figure 7B:
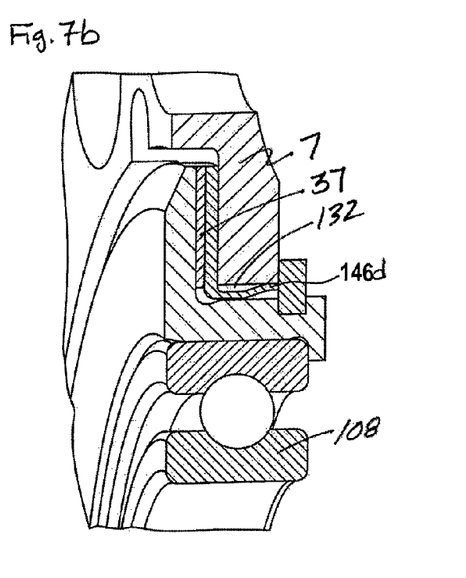
FIG. 7b is a perspective section view of a tenth embodiment of the combination of a radial bearing with an axial bearing including a radial spring element with a radial wall.
Figure 7C:
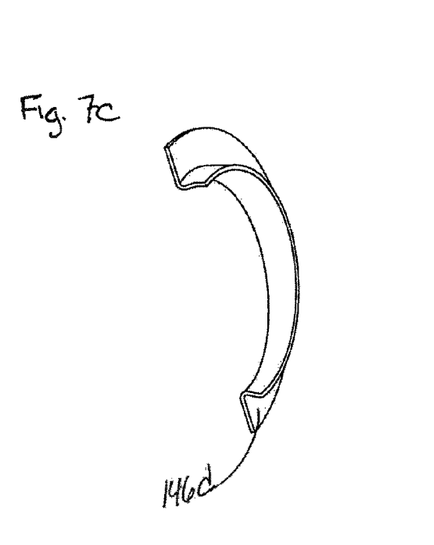
FIG. 7c is a perspective section view of the radial spring element of FIG. 7b.
Figure 7D:
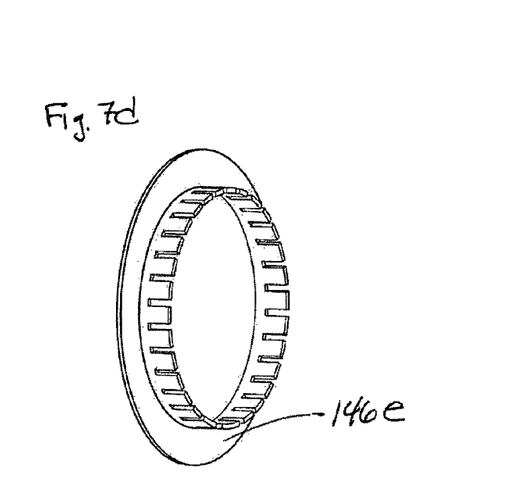
FIG. 7d is a perspective view of an alternative embodiment of the radial spring element of FIG. 7b including axial tabs.

FIG. 7*a* is a perspective section view of an example embodiment of the combination including radial spring element 146*c*, wherein radial section 36 of the intermediate element is formed as a single piece with the external bearing race of roller bearing 108. FIG. 7*b* is a perspective section view of an example embodiment of the combination of a radial bearing with an axial bearing including radial spring element 146*d* including a radial wall. FIG. 7*c* is a perspective section view of radial spring element 146*d*. FIG. 7*d* is a perspective view of radial spring element 146*e* including axial tabs.

The exemplary embodiments are not to be understood as restriction of the invention. On the contrary, within the scope of the present disclosure, numerous changes and modifications are possible, in particular such that can be formed through the combination or modification of individual features or if applicable of elements of process steps in connection with those contained in general and figure description as well as those described in the claims and drawings.

LIST OF REFERENCE SYMBOLS 1 torque transmission device
2 twin clutch
3 subunit
4 subunit
5 friction clutch
6 friction clutch
7 intermediate pressure plate
8 bearing
9 clutch disc
9a hub
10 clutch disc
10a hub
11 friction lining
12 friction lining
13 pressure plate
13a support section
14 pressure plate
15 housing
16 radially aligned section
17 tension element
18 support section
19 rolling facing
20 connection component
21 radial section
22 drive plate
23 screws
24 screw connections
25 leaf spring connections
26 leaf spring
27 leaf spring
28 riveted connection
29 riveted connection
30 riveted connection
31 riveted connection
32 annular clearance
33 intermediate element
34 radial internal section
35 axial section
36 radial section
37 friction or if applicable slip lining
37a annular support disc
38 locking element
39 rotation axis
40 lever element
41 lever element
108 ball bearing
132 radial clearance
133 intermediate element
137 axial plain bearing
138 support or if applicable positioning rings
142 support or if applicable positioning rings
143 transmission input shaft
144 support plate
145 support disc
146 spring element
146a radial spring element
146b radial spring element with tongues
146c radial spring element with snap fit
146d radial spring element with radial wall
146e radial spring element with axial tabs
147 self-aligning bearing
Da external diameter
Di internal diameter

What is claimed is:

1. A torque transmission device for the application in the drive train of a vehicle, between a driven shaft of a drive unit and a transmission, with at least two transmission input shafts, in which the torque transmission device comprises:
at least two friction clutches which respectively feature a clutch disc, which can be coupled respectively with one of the transmission input shafts, and an intermediate pressure plate disposed between respective friction linings of the clutch discs, in which the friction lining of both clutch discs may be clamped respectively between the intermediate pressure plate and one pressure plate, in which the respective pressure plates are disposed on the side of the friction lining that faces away relative to the intermediate pressure plate, still the two pressure plates with the intermediate pressure plate are at least rotationally coupled and are axially displaceable by actuation elements relative to the latter, in which at least the two friction clutches form a preassembled clutch assembly, which can be preassembled on the transmission side and which is at least non-rotatably connectable with a drive element mounted on the driven shaft of the drive unit during the assembly of the drive unit and transmission, wherein the intermediate pressure plate is supported by a bearing on at least one of the transmission input shafts in at least one axial direction, in which the intermediate pressure plate is capable of radial displacement relative to the rotation axis of the transmission input shafts.

2. The torque transmission device according to claim 1, wherein the radial displacement possibility is provided between the bearing mounted on one of the transmission input shafts and the intermediate pressure plate.

3. The torque transmission device according to claim 1, wherein the radial displacement possibility is guaranteed by radial clearance between a component that at least supports the intermediate pressure plate axially and the intermediate pressure plate.

4. The torque transmission device according to claim 1, wherein the intermediate pressure plate is displaceable in radial direction against displacement resistance between the intermediate pressure plate and the bearing and/or between the bearing and the transmission input shaft holding the bearing.

5. The torque transmission device according to claim 4, wherein the displacement resistance is sufficiently great to position the intermediate pressure plate in a definite location in radial direction.

6. The torque transmission device according to claim 4, wherein the displacement resistance is at least generated by a frictional connection.

7. The torque transmission device according to claim 1, wherein the intermediate pressure plate features a radial internal, circumferential section that is axially supported and/or clamped.

8. The torque transmission device according to claim 1, wherein the bearing comprises a bearing mounted on one of the transmission input shafts that hold the intermediate pressure plate.

9. The torque transmission device according to claim 1, wherein the bearing comprises a roller bearing with an internal bearing race on one of the transmission input shafts and one external bearing race that is functionally connected with the intermediate pressure plate at least in axial direction.

10. The torque transmission device according to claim 1, wherein actuation forces of the friction clutches are supported by a bearing.

* * * * *